US006996071B2

(12) United States Patent  
Perkinson et al.

(10) Patent No.: US 6,996,071 B2  
(45) Date of Patent: Feb. 7, 2006

(54) BINARY DECISION TREE-BASED ARBITRATOR FOR PACKETIZED COMMUNICATIONS

(75) Inventors: David Perkinson, Madison, AL (US); Walter Stuart Venters, Huntsville, AL (US)

(73) Assignee: Adtran Inc., Huntsville, AL (US)

( * ) Notice: Subject to any disclaimer, the term of this patent is extended or adjusted under 35 U.S.C. 154(b) by 1136 days.

(21) Appl. No.: 09/845,638

(22) Filed: Apr. 30, 2001

(65) Prior Publication Data

US 2002/0159397 A1 Oct. 31, 2002

(51) Int. Cl.  
*H04L 12/28* (2006.01)

(52) U.S. Cl. ........................ 370/256; 370/463
(58) Field of Classification Search ........ 370/254–257, 370/444, 449, 451, 455, 461, 463, 400, 401  
See application file for complete search history.

(56) References Cited

U.S. PATENT DOCUMENTS

| | | | | |
|---|---|---|---|---|
| 5,357,508 A | * | 10/1994 | Le Boudec et al. | 370/397 |
| 5,781,531 A | | 7/1998 | Charny | 370/232 |
| 5,963,553 A | | 10/1999 | Wicklund | 370/392 |
| 5,991,298 A | | 11/1999 | Hunt et al. | 370/390 |
| 6,028,860 A | * | 2/2000 | Laubach et al. | 370/395.64 |
| 6,061,330 A | | 5/2000 | Johansson | 370/229 |
| 6,067,457 A | | 5/2000 | Erickson et al. | 455/512 |
| 6,850,522 B2 | * | 2/2005 | Hasegawa et al. | 370/390 |

\* cited by examiner

Primary Examiner—Ricky Ngo  
Assistant Examiner—Duc Duong  
(74) Attorney, Agent, or Firm—Allen, Dyer, Doppelt, Milbrath & Gilchrist, P.A.

(57) ABSTRACT

A binary decision tree-based arbitration scheme executable by a control processor of a time division multiplex (TDM)-based communication system is operative to select the next packet to be transmitted from a plurality of virtual circuits, any number of which may have one or more packets awaiting transmission over a serialized digital communication link. The transmission priority scheme contains N+1 sets of nodes containing $2^{N+1}-1$ nodes. A respective ith set of nodes comprises $2^{i-1}$ nodes, wherein i is greater than or equal to 1, and less than or equal to N+1. The nodes of a given set are connected to those of an adjacent set by binary-split branches. For each of the $2^N$ leaf nodes of the decision tree, information is stored representative of the transmission priority of a packet awaiting transmission from its associated communication port. In addition, associated with each node branching to respective pairs of downstream nodes (toward the virtual circuit ports) is a 'pointer' code that points to whichever one of its two branched nodes is associated with a higher packet transmission priority. As one traverses the decision tree along sequentially split branch paths from the highest priority leaf node toward the root node, the pointer code of the next immediately adjacent upstream node will always point to the node-branch path leading to the highest priority leaf node. Thus, the root node will point to the leaf node having the highest transmission priority.

6 Claims, 2 Drawing Sheets

BINARY DECISION TREE-BASED ARBITRATOR FOR PACKETIZED COMMUNICATIONS

FIELD OF THE INVENTION

The present invention relates in general to communication networks and systems employed for the transport of digital telecommunication signals, and is particularly directed to a new and improved binary decision tree-based arbitration scheme that is executable by a supervisory control processor of a time division multiplex (TDM)-based communication system, and is operative to select the next packet to be transmitted from a plurality of virtual circuits, any number of which may have one or more packets awaiting transmission over a serialized digital communication link.

BACKGROUND OF THE INVENTION

Digital communication systems enable telecommunication service providers (for example, a competitive local exchange carrier (CLEC), such as an internet service provider (ISP)), to provide various types of high speed digital service over network circuits of an incumbent local exchange carrier (ILEC), such as a Bell operating company (RBOC), serving a number of customer premises equipments (CPEs) having a wide range of operational bandwidths and digital subscriber line termination capabilities. A reduced complexity example of such a digital communication network architecture is diagrammatically illustrated in FIG. 1 as comprising a PCM communication link (such as an optical fiber) 10, through which a network (cloud) 20 at a 'west' end of the link 10 may transmit and receive digital telecommunication signals (e.g., packetized T3 traffic) with respect to customer premises equipments (CPEs) served by a remote termination site (RTS) 30 at an 'east' end of the PCM link 10.

As shown in FIG. 2, in order to handle transmission requests from the virtual circuits (VCs) that are associated with various customer equipments (CPEs), the equipment shelf of a remote terminal 30 terminating the 'east' end of the PCM link 10 typically contains a supervisory communication control processor 40, one of the functions of which is to arbitrate/grant the interfacing of packets awaiting transmission from one or more virtual circuit ports $P_{VC1}$–$P_{VCN}$ to the PCM serial link 10. Now although a maximal speed/memory processor architecture could be used to execute a sequential polling scheme to accomplish this task, doing so would not only be cost-prohibitive from a commercial application standpoint, but could be expected to be a less than efficient use of available bandwidth (e.g., checking each and every virtual circuit port including those having no data to transmit).

SUMMARY OF THE INVENTION

In accordance with the present invention, this virtual circuit servicing problem is successfully remedied by employing a binary decision tree-based transmission assignment mechanism, that is operative to point directly to the virtual circuit currently having the highest transmission priority as a result of the most immediately precedent transmission, and to update the transmission priority of the nodes of the decision tree each time a packet awaiting transmission has been serviced.

The transmission priority scheme of the invention is comprised of N+1 sets of nodes containing $2^{N+1}-1$ nodes that define a binary decision tree-structure. A respective ith set of nodes comprises $2^{i-1}$ nodes, wherein i is greater than or equal to 1, and less than or equal to N+1. The nodes of a given set are connected to those of an adjacent set by binary-split branches. Thus, a first node set contains a single (or root) termination node, associated with a port associated with a serialized digital communication link. The second node set contains two nodes that are coupled by a pair of respective branches to the root node, and so on, to the N+1th set of nodes at the end of the decision tree opposite to the root node, wherein an (N+1)th node set contains $2^{(N)}$ leaf nodes associated with respective communication ports of $2^N$ virtual circuits.

For each of the $2^N$ leaf nodes of the decision tree, information is stored representative of the transmission priority of a packet that may be awaiting transmission from its associated communication port. In addition, associated with each of those nodes that branch to respective pairs of downstream nodes (toward the virtual circuit ports) is a respective stored code value, or 'pointer' code that, points to whichever one of its two branched nodes is associated with a higher packet transmission priority.

As a result, as one traverses the decision tree along sequentially split branch paths from the highest priority leaf node toward the root node, the pointer code of the next immediately adjacent upstream node will always point to the node-branch path leading to the highest priority leaf node. This means that the root node will always point to the highest priority leaf node. Namely, the highest priority transmission priority code will 'ripple' through the decision tree to the pointer data stored at the root node. This means that in order to determine from which virtual circuit the next packet is to be obtained and coupled to the serialized data link, the communication controller need look no further than the root node.

Once the current packet request has been honored (a virtual circuit delivers a packet to the transmitter (the root of the decision tree)) it recalculates its priority, in preparation for the next decision tree operation. Recalculating the priority on every packet transmission avoids imparting additional delay to high-priority, time-sensitive, traffic flowing in a congested network. This priority recalculation may include one or more of a number of factors, such as, but not limited to arrival time of the next packet in the queue, the current bandwidth utilization of the virtual circuit, the type of the next packet in the queue, and user-assigned weight or quality of service.

With priority recalculated, the pointer codes of the decision tree are updated to reflect the leaf node which now points to the highest priority port (which could be the same as or different from the previous port). The communications controller need only look to the root node for the pointer to the leaf node and thereby virtual circuit port from which the next packet is to be selected for transmission.

DETAILED DESCRIPTION

Figure 1:
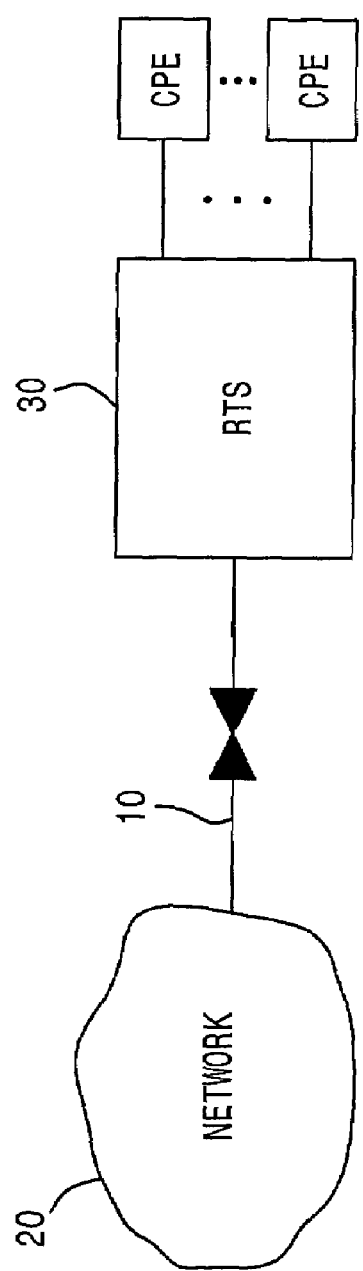
FIG. 1 is a reduced complexity diagram of a digital communication network architecture.

Before describing in detail the new and improved binary decision tree-based transmission arbitration mechanism in accordance with the present invention, it should be observed that the invention resides primarily in what is effectively a prescribed communication control mechanism that is executable by the hardware and software of supervisory communications control components of conventional digital communication circuitry, including digital signal processing components and attendant supervisory control circuitry therefor, that controls the operations of such circuits and components.

As a consequence, the configuration of such circuits and components and the manner in which they are interfaced with other communication system equipment have, for the most part, been illustrated in the drawings by readily understandable block diagrams, which show only those specific details that are pertinent to the present invention, so as not to obscure the present disclosure with details which will be readily apparent to those skilled in the art having the benefit of the description herein. Thus, the diagrammatic illustrations are primarily intended to show the major components and functional operations of the invention in the context of a present day digital communication network in a convenient functional grouping, whereby the present invention may be more readily understood.

Figure 2:
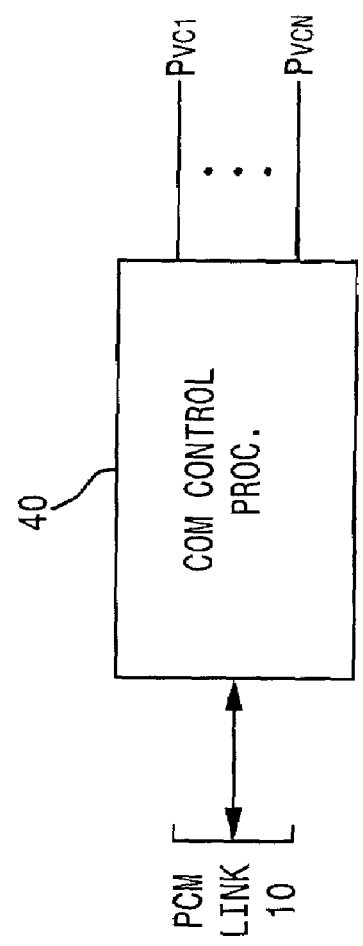
FIG. 2 shows a supervisory control processor employed by a remote unit terminating a PCM link to arbitrate/assign the interfacing of packets awaiting transmission from one or more virtual circuits served by the remote unit.
Figure 3:
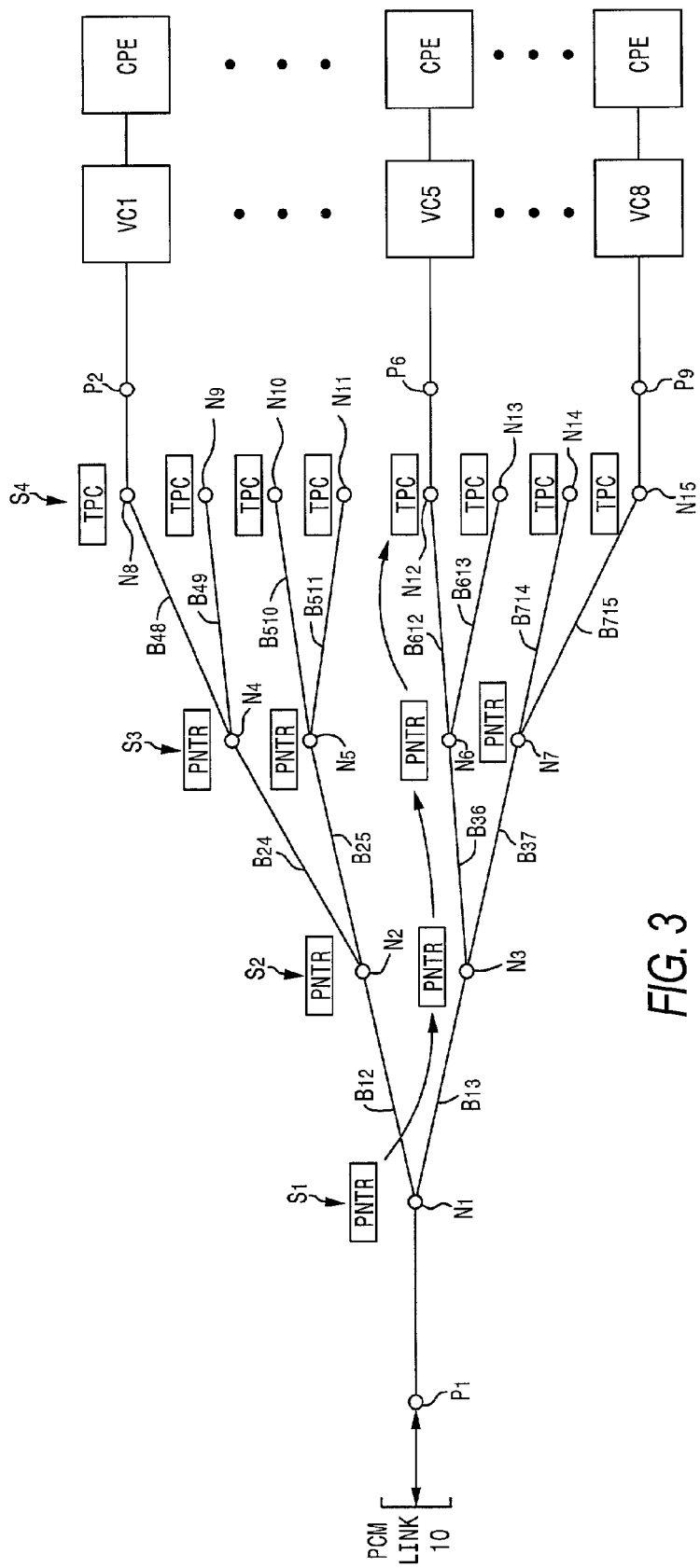
FIG. 3 diagrammatically illustrates the binary decision tree-based transmission assignment mechanism of the present invention.

Attention is now directed to FIG. 3, which diagrammatically illustrates a reduced complexity example of the binary decision tree-based transmission assignment mechanism of the present invention. As pointed out above, this transmission assignment mechanism is executable by a supervisory communications control processor of remote communications unit terminating a serialized digital communication link, such as that shown in FIGS. 1 and 2, described above, to expeditiously arbitrate/assign the interfacing of packets awaiting transmission from one or more of a plurality of virtual circuits served by the remote unit.

The reduced complexity example of FIG. 3 illustrates the case of arbitrating packet transmission requests for up to $2_{(N=3)}$ or eight virtual circuits VC1–VC8. It is to be understood, however, that the invention is not limited to this or any particular number. The choice of eight virtual circuits in the example of FIG. 3 serves to reduce the complexity of the drawings, while still providing a useful illustration of the principles of the invention.

Irrespective of the number of virtual circuits, the transmission assignment network is comprised of N+1 sets of nodes containing $2^{N+1}-1$ nodes that define a binary decision tree-structure. In the present example of servicing eight virtual circuits, the decision tree-structure of FIG. 3 is comprised of (N=3)+1 or four sets of nodes (comprised of node sets S1, S2, S3 and S4), that contain a total of fifteen nodes N1–N15, that are interconnected by branches B of the decision tree. A respective ith set of nodes comprises $2^{i-1}$ nodes, wherein i is greater than or equal to 1, and less than or equal to N+1.

Thus, a first (i=1) node set S1 contains a single (or root) termination node N1, that is associated with a port P1 coupled to the serialized digital communication link 10. As $2^N$ is equal to or greater than the number of virtual circuit communication ports, at the other end of the decision tree, a fourth (i=4) node set S4 of nodes contains $2^{(N=3)}=8$ leaf nodes N8–N15 that are associated with respective communication ports P2–P9 for up to eight virtual circuits VC1–VC8. The (i=2) second node set S2 contains two nodes N2 and N3, coupled by respective branches B12, B13 to the root node N1. The third (i=3) node set S3 contains four nodes N4–N7, that are coupled by respective branches B24, B25; B36, B37 to nodes N2 and N3 of the second set S2. The eight leaf nodes N8–N15 of the fourth node set S4 are coupled by respective branches B48, B49; B510, B511; B612, B613; and B714, B715 to nodes N4–N7 of the third set S3.

For each of the $2^N$ leaf nodes of the decision tree, there is first stored information (a transmission priority code shown by a transmission priority code box TPC) representative of the priority of transmission of a packet that may be awaiting transmission from its associated communication port. In addition, associated with each of those nodes that branch to respective pairs of downstream nodes (toward the virtual circuit ports), namely with nodes N1–N7 (as none of the leaf nodes N8–N15 branches to a further pair of nodes), is a respective stored code value or 'pointer' code (denoted by box PNTR), that points to whichever one of its two branched nodes is associated with a higher packet transmission priority.

For purposes of the present example, let it be assumed that of the eight ports P2–P9, virtual circuit VC5 (associated with port P6) has the highest transmission priority. Thus, the pointer code associated with immediately upstream branched node N6 of the third set S3 of nodes (shown by arrow 6–12) will point to leaf node N12, corresponding to virtual circuit port P6, which has a higher priority than the other lead node N13 branched from node N6. Since the pointer associated with branched node N6 of the third set S3 of nodes points to the leaf node (N12) having the highest transmission priority, then the pointer (shown by arrow 3–6) associated with its immediately upstream branched node N3 of the second node set S2 will point to node N6 and thereby to leaf node N12, whose transmission priority is higher than either of the leaf nodes (N14, N15) branched from the other node N7 which, in turn, is branched from node N3.

In a similar manner, as the pointer (3–6) associated with branched node N3 of the second set S2 of nodes points to the leaf node (N12) having the highest transmission priority, then the pointer (shown by arrow 1–3) associated with its immediately upstream branched node (here root node N1) of the first node set S1 will point to node N3 and thereby to leaf node N12. Since node N3 points to a (highest priority) leaf node (N12) whose transmission priority is higher than any of the leaf nodes pointed to by the other node (N2) branched from root node N1, the root node N1 necessarily points the highest priority leaf node N12.

Namely, the highest priority transmission priority code (in the present example, associated with virtual circuit VC5) will 'ripple' through the decision tree to the pointer data stored at the root node N1. This means that in order to determine from which virtual circuit the next packet is to be obtained and coupled to the serialized data link, the communication controller need look no further than the root node N1, which always points to the highest priority leaf node (leaf node N12 in the present example).

Once the current packet request has been honored (a virtual circuit delivers a packet to the transmitter (the root of the decision tree)) it recalculates its priority, in preparation for the next decision tree operation. As pointed out above, recalculating the priority on every packet transmission avoids imparting additional delay to high-priority, time-sensitive, traffic flowing in a congested network. This priority recalculation may include one or more of a number of factors, such as, but not limited to arrival time of the next packet in the queue, the current bandwidth utilization of the virtual circuit, the type of the next packet in the queue, and user-assigned weight or quality of service. Once priority has been recalculated, the pointer codes of the decision tree are updated to reflect whichever leaf node now points to the highest priority port (which could be the same as or different from the previous port). Again, the communications controller need look to only the root node for the pointer to the leaf node and thereby virtual circuit port from which the next packet is to be selected for transmission.

As will be appreciated from the foregoing description, the binary decision tree-based transmission assignment mechanism of the present invention provides a reduced complexity and cost scheme for servicing a large number of virtual circuits, and thereby obviates the need for a maximal speed/memory processor architecture to sequentially the circuits. As noted previously, not only is polling a large number of circuits cost-prohibitive, but is typically a less than efficient use of available bandwidth, as it involves checking each virtual circuit port including those having no data to transmit.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. For use with a digital communication system in which a terminal serving a plurality of circuits, from which requests for transmission of one or more digital information packets awaiting transmission over a serialized data path may be supplied, a method of controllably interfacing packets awaiting transmission from ports associated with said plurality of circuits with said serialized data path, said method comprising the steps of:
   (a) providing a binary decision tree-based transmission assignment network having a root node associated with said serialized data path, a plurality of leaf nodes associated with respective ports of said plurality of circuits and intermediate branch nodes that define a binary decision tree-structure between said root node and said plurality of leaf nodes;
   (b) storing for each node of said network, other than said leaf nodes, a pointer to whichever of its two adjacent downstream nodes effectively points to a leaf node whose associated circuit currently has highest transmission priority, thereby providing said root node with a pointer to the circuit currently having highest transmission priority; and
   (c) coupling, to said serialized data path, a packet from the circuit whose leaf node is pointed to by said root node.

2. The method according to claim 1, further including the step of:
   (d) recalculating transmission priority and updating the pointers of said binary decision tree-based transmission assignment network stored in step (b), in accordance with whichever leaf node's associated circuit has highest transmission priority as a result of the execution of step (c).

3. For use with a digital communication system in which a terminal serving a plurality of circuits, from which requests for transmission over a serialized data path may be supplied of one or more digital information packets, a method of controllably interfacing packets awaiting transmission from communication ports associated with said plurality of circuits with said serialized data path, said method comprising the steps of:
   (a) providing a binary decision tree-based transmission assignment network having N+1 sets of nodes containing $2^{N+1}-1$ nodes that define a binary decision tree-structure between a first port adapted to be coupled to said serialized data path, and $2^N$ communication ports, that are adapted to be coupled to said plurality of communication circuits, wherein $2^N$ is equal to or greater than the number of said communication circuits, said N+1 sets of nodes including a first, root node associated with said first port and $2^N$ leaf nodes, respectively associated with said $2^N$ communication ports, a respective ith set of nodes comprising $2^{i-1}$ nodes, wherein i is greater than or equal to 1, and less than or equal to N+1;
   (b) storing, for each of said $2^N$ leaf nodes of said network, first information representative of priority of transmission of a packet that may be awaiting transmission from an associated communication port over said serialized data path;
   (c) storing, for a respective node of an ith set of nodes, a pointer to that node of an (i+1)th set of nodes that is associated with a leaf node having a relatively higher transmission priority; and
   (d) coupling, to said serialized data path, a packet from the circuit whose leaf node is pointed to by said root node.

4. The method according to claim 3, further including the step (e) of recalculating the transmission priority of the leaf node for which a packet was coupled to said serialized data path in step (d), and updating the pointers of said binary decision tree-based transmission assignment network.

5. A method of controlling the operation of a communications controller for a digital communication network having a serialized digital communication link, through which a network coupled to a first end at the link may transmit and receive digital telecommunication packets with respect to a plurality of communication ports associated with customer premises equipments served by a remote termination site at an opposite end of the link, said communications controller being installable in said remote termination site, said method being effective to cause said communications controller to handle packet transmission requests from virtual circuits coupled with said plurality of communication ports and associated with said customer equipments, and thereby selectively grant transmission to a packet over said serialized digital communication link, said method comprising the following steps:
   (a) providing a binary decision tree-based transmission assignment network having N+1 sets of nodes containing $2^{N+1}-1$ nodes that define a binary decision tree-structure between a first node associated with a port adapted to be coupled to said serialized digital communication link, and $2^N$ leaf nodes respective ones of which are associated with respective ones of said communication ports, wherein $2^N$ is equal to or greater than the number of communication ports, said N+1 sets of nodes including a first, root node associated with said first port, a respective ith set of nodes comprising $2^{i-1}$ nodes, wherein i is greater than or equal to 1, and less than or equal to N+1;
   (b) storing, for each of said $2^N$ leaf nodes of said network, first information representative of priority of transmission of a packet that may be awaiting transmission from an associated communication port over said serialized digital communication link;
   (c) storing, for a respective node of an ith set of nodes, a pointer to that node of an (i+1)th set of nodes that is associated with a leaf node having a relatively higher transmission priority; and
   (d) coupling, to said serialized digital communication link, a packet from the circuit whose leaf node is pointed to by said root node.

6. The method according to claim 5, further including recalculating the transmission priority of the leaf node for which a packet was coupled to said serialized digital communication link in step (d), and updating the pointers of said binary decision tree-based transmission assignment network.

* * * * *